(12) United States Patent
Albano

(10) Patent No.: US 10,135,111 B2
(45) Date of Patent: Nov. 20, 2018

(54) COMBINE HARVESTER ANTENNA MOUNTING

(71) Applicant: AGCO INTERNATIONAL GmbH, Hesston, KS (US)

(72) Inventor: Moresco Albano, Breganze (IT)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 15/585,247

(22) Filed: May 3, 2017

(65) Prior Publication Data

US 2017/0324137 A1    Nov. 9, 2017

(30) Foreign Application Priority Data

May 9, 2016 (GB) .................................. 1608100.2

(51) Int. Cl.
*F16M 13/00* (2006.01)
*H01Q 1/12* (2006.01)
*H01Q 1/32* (2006.01)
*A01D 41/12* (2006.01)
*B60R 11/00* (2006.01)

(52) U.S. Cl.
CPC .......... *H01Q 1/1214* (2013.01); *A01D 41/12* (2013.01); *H01Q 1/3275* (2013.01); *A01D 41/1208* (2013.01); *B60R 11/00* (2013.01); *B60R 2011/004* (2013.01); *B60R 2011/008* (2013.01); *H05K 999/99* (2013.01)

(58) Field of Classification Search
CPC .. H01Q 1/1214; H01Q 1/3275; H01Q 15/161; H01Q 1/08; H01Q 1/1235; A01D 41/1208; A01D 41/1226; B60R 11/00; B60R 2011/004; B60R 2011/008

USPC ......... 343/915, 711, 880–882; 248/564, 584, 248/585
See application file for complete search history.

(56) References Cited

U.S. PATENT DOCUMENTS 4,771,293 A *  9/1988  Williams ................. H01Q 1/08
                                                    343/757
5,646,638 A *  7/1997  Winegard ............... H01Q 1/08
                                                    343/840

(Continued)

FOREIGN PATENT DOCUMENTS

DE    10244822 A1    4/2004
EP     0970595 A1    1/2000
(Continued)

OTHER PUBLICATIONS

UK Intellectual Property Office; International Search Report for UK Priority Application No. GB1608100.2 dated Nov. 3, 2016.
(Continued)

*Primary Examiner* — Christopher Garft

(57) ABSTRACT

An antenna mounting apparatus for a combine harvester where the apparatus includes a first grain tank extension panel mounted to a frame so as to be moveable between an open, extended, position and a closed, retracted, position. An antenna-supporting bracket is pivotally mounted to the grain tank extension panel around a first pivot axis. Actuation means are provided to pivot the antenna-supporting bracket with respect to the grain tank extension member when the grain tank extension panel moves between the open position and closed position.

8 Claims, 2 Drawing Sheets

(56) References Cited

U.S. PATENT DOCUMENTS

| | | | |
|---|---|---|---|
| 5,865,414 A * | 2/1999 | Beitzel | A47B 5/00 |
| | | | 248/284.1 |
| 6,079,689 A * | 6/2000 | Beitzel | A47B 21/00 |
| | | | 248/282.1 |
| 6,508,705 B1 | 1/2003 | Van Overschelde | |
| 2001/0018638 A1 * | 8/2001 | Quincke | A01B 79/005 |
| | | | 701/468 |
| 2007/0135190 A1 | 6/2007 | Diekhans et al. | |
| 2009/0040130 A1 * | 2/2009 | Conrad | H01Q 1/1214 |
| | | | 343/882 |

FOREIGN PATENT DOCUMENTS

| | | | |
|---|---|---|---|
| EP | 1795986 | A2 | 6/2007 |
| JP | H10117508 | A | 5/1998 |
| JP | 2013252103 | A | 12/2013 |

OTHER PUBLICATIONS

EP Patent Office, International Search Report for related EP Application No. 17164578.1, dated Sep. 27, 2017.

\* cited by examiner

COMBINE HARVESTER ANTENNA MOUNTING

BACKGROUND

Field of Invention

The invention relates to combine harvesters and particularly to antenna mounting apparatus for securing an antenna to a grain tank extension panel of a combine harvester.

Discussion of Related Art

Modern agricultural machinery is commonly fitted with an antenna or GPS receiver for communicating with satellites or land-based transmitters. Such antennas are preferably mounted at height to achieve a good communication link with the satellites and transmitters. However, mounting the antennas to the top of agricultural machinery renders them vulnerable to damage from overhanging tree branches. Furthermore, maximum vehicle height legislation in some countries relating to transportation on public highways (typically set at 4 meters), prevents the installation of the antenna at the highest point of the machine.

With regard to combine harvesters, it is known to fit an antenna to grain tank extension panels such as those disclosed in U.S. Pat. No. 6,508,705 for example. Such panels serve to increase the holding volume of an on-board tank and unfold into an extended or open position when operating in the field. The extension panels are foldable into a closed position for transport and in which the panels also provide protection against the weather by covering the top of the grain tank.

By mounting the antenna to the grain tank extension panels a sufficient height is achieved when working in the field. However the antenna remains vulnerable to damage during transport and hinders the folding of the extension panel assemblies. Moreover, removal of the antenna is often required for shipping of the machine.

BRIEF SUMMARY OF THE INVENTION

According to the invention there is provided antenna mounting apparatus for a combine harvester, the apparatus comprising a first grain tank extension panel mounted to a frame so as to be moveable between an open, extended, position and a closed, retracted, position, an antenna-supporting bracket pivotally mounted to the grain tank extension panel around a first pivot axis, and actuation means adapted to pivot the antenna-supporting bracket with respect to the grain tank extension member when the grain tank extension panel moves between the open position and closed position.

By pivotally mounting the antenna supporting bracket to the grain tank extension panel the antenna can extend beyond the extension panels when in the open position and be folded away under the extension panel when in a closed non-operative position.

The actuation means preferably comprises a mechanical linkage coupled to the bracket, the linkage being arranged so as to couple pivoting movement of the bracket with movement of the extension panel. Advantageously, the antenna bracket is pivoted out of the way simultaneously as the grain tank extension panel is folded into the closed position. Conversely, the antenna bracket is caused to be moved into an operative position simultaneously as the extension panel is unfolded into the open position. The mechanical linkage may comprise a coupling rod which is pivotally connected at a first end to the bracket and at a second end to the frame or another component that moves with respect to the tank extension panel during a folding or unfolding movement.

The grain tank extension panel may form one of a pair of extension panels together providing a grain tank extension panel assembly. The first extension panel may be pivotally mounted to the second extension panel wherein the second extension panel is pivotally mounted to the frame. The axes around which the antenna supporting bracket and first and second extension panels move are preferably parallel to one another.

A grain tank extension panel assembly having a plurality of pivotally connected panels is known and allows for a reduced height when the panel assembly is fully unfolded as compared to a single panel assembly. A pair of such grain tank extension panel assemblies may be provided, each assembly being mounted along opposing edges of the associated grain tank wherein the panel assemblies are configured to provide a protective cover for the grain tank when in the closed position.

The mechanical linkage may comprise a coupling rod connected at a first end to the antenna supporting bracket and at a second end to the second extension panel to which the first extension panel is pivotally connected. The relative movement between the first and second extension panels is thus exploited to pivot the antenna supporting bracket during a folding or unfolding action.

BRIEF DESCRIPTION OF THE DRAWINGS

Further advantages of the invention will become apparent from reading the following description of a specific embodiment with reference to the appended drawings in which.

DETAILED DESCRIPTION OF A SPECIFIC EMBODIMENT

Figure 1:
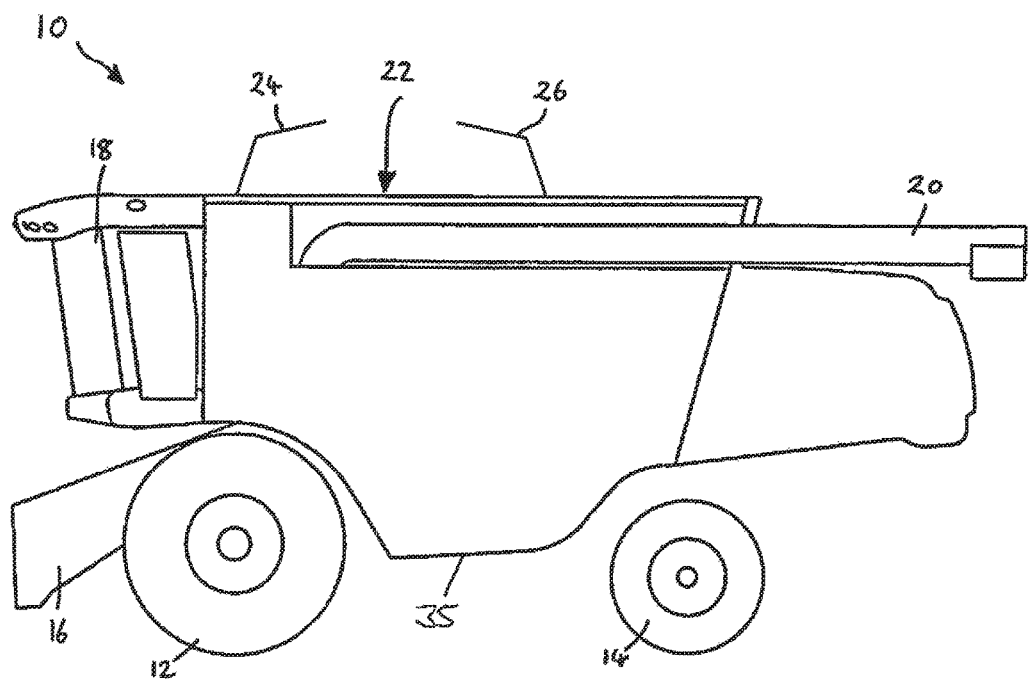
FIG. 1 is schematic side view of a combine harvester fitted with front and rear grain tank extension panel assemblies.

With reference to FIG. 1 a combine harvester 10, hereinafter referenced simply as 'combine' of known construction is shown. In brief, the combine 10 comprises front and rear wheels 12,14, a feederhouse 16 for the attachment of a header (not shown), a driver's cab 18 and an unloading auger 20. As is known, the combine 10 houses crop material processing apparatus which is hidden from view and serves to thresh, separate and clean grain which is conveyed to an on-board tank designated at 22.

The effective volume of grain tank 22 is increased by the provision of front and rear grain tank extension panel assemblies 24,26 which are shown in schematic form in FIG. 1 in an open, or raised, position. The front and rear assemblies 24,26 may cooperate with folding side wall panels (not shown) which unfold upwardly in tandem with the front and rear assemblies 24,26. Such grain tank extension assemblies are known and described, for example, in U.S. Pat. No. 6,508,705, the entire contents of which is incorporated herein by reference.

Figure 2A:
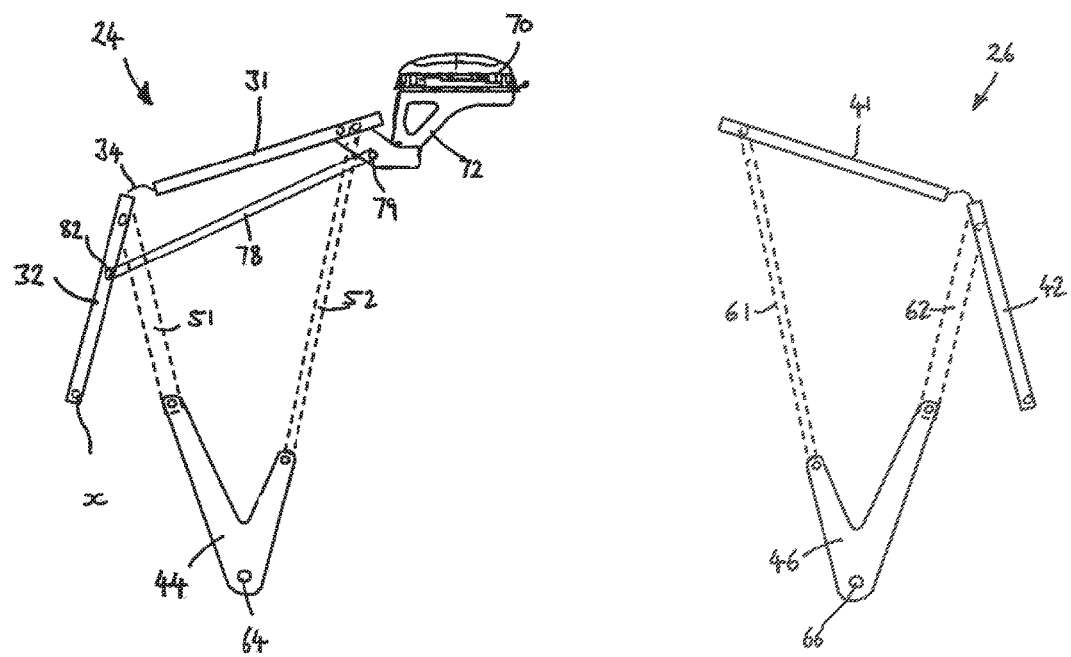
FIG. 2A is a schematic side view of the grain tank extension panel assemblies of FIG. 1 shown in an open position and fitted with an antenna in accordance with an embodiment of the invention.
Figure 2B:
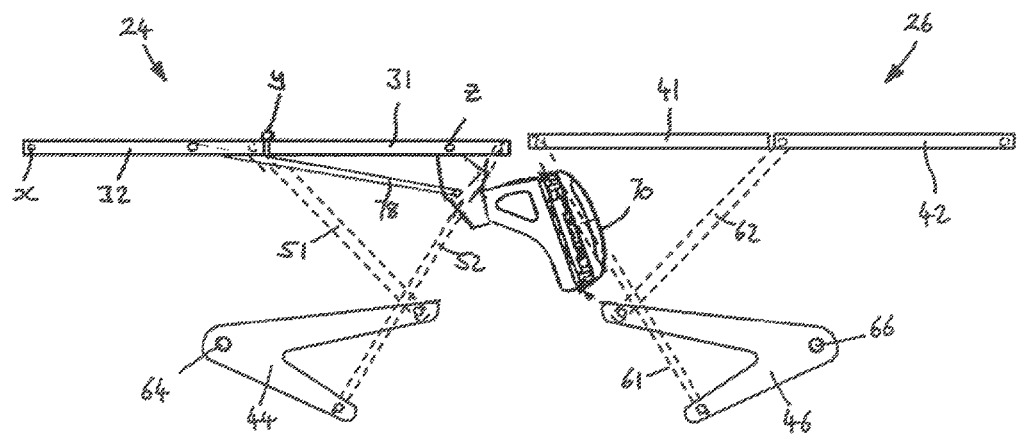
FIG. 2B shows the grain tank extension panel assemblies of FIG. 2a but in a closed position; and, FIG. 3 shows an enlarged perspective view of the antenna supporting bracket fitted to the grain tank extension panel assembly of FIGS. 2A and 2B.

FIGS. 2A and 2B show the front and rear extension panel assemblies 24,26 in an open position and a closed position respectively. Starting with FIG. 2a, the front assembly 24 includes a first panel 31 and a second panel 32, each panel extending across the width of the grain tank 22 (into the plane of the paper) and being generally rectangular in shape. The first and second panels 31,32 fold and unfold in a concertina-type manner. First panel 31 is hinged along a front edge to second panel 32 by a hinge represented at 34, the hinge 34 defining a pivot axis y. Second panel 32 is hinged along a front edge to the combine frame 35 so as to be pivotable around transverse axis x. First panel 31 is thus pivotable with respect to second panel about an axis Y which is parallel to pivot axis x.

The rear grain tank extension panel assembly 26 has a similar construction and includes a pair of rectangular panels 41,42 which are hinged to one another and connected to the frame 35 in the same manner as the front assembly 24. The movement of the rear assembly 26 is typically controlled so as to mimic the movement of the front assembly 24.

The grain tank extension panels 31,32,41,42 are unfolded into an open position (FIG. 2A) and folded into a closed position (FIG. 2b) by front and rear crank members 44,46 which are connected to the panels 31,32,41,42 by respective rods 51,52,61,62. The crank members 44,46 are mounted upon transverse crank shafts 64,66 which are mounted to the combine frame 35 and rotate so as to raise and lower the extension panels 31,32,41,42 as required. Each crank member 44,46 comprises a pair of crank arms each being associated with one of the extension panels and each being connected to one end of the associated rods 51,52,61,62. It should be appreciated however that the twin-armed crank members may be replaced by separate crank arms mounted upon the shafts 64,66 without deviating from the scope of the invention.

The lengths of the crank members 64,66 and connecting rods 51,52,61,62 are chosen so as to lower the extension panels 31,32,41,42 into a flat or horizontal position as shown in FIG. 2B wherein the grain tank 22 is protected from rain and the like.

Figure 3:
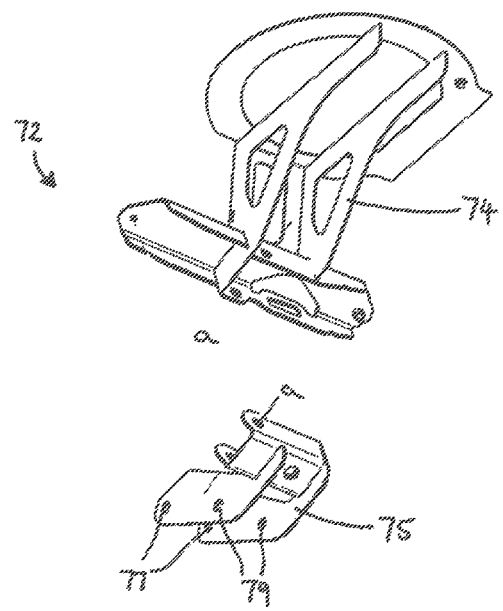

An antenna 70 is mounted upon a support bracket assembly 72 which is shown in more detail in FIG. 3. Bracket assembly 72 includes a first portion 74 upon which the antenna is mounted and a second portion 75 which serves to pivotally connect the first portion 74 to the first extension panel 31 in accordance with an aspect of the invention. First portion 74 is secured to the second portion 75 by a bolt inserted through holes aligned on axis 'a'.

The bracket assembly 72 is pivotally mounted to first panel 31 by a pin inserted through holes 77 which provides a pivot axis z. Pivot axis z is transverse and thus parallel with axes x and y.

A mechanical linkage in the form of a coupling rod 78 is connected between the bracket assembly 72 and the second extension panel 32. The coupling rod serves to pivot the antenna 70 into a stowed position when the extension panels 31,32 are folded into a closed position as shown in FIG. 2b. Conversely, the coupling rod serves to extend the antenna 70 into a deployed position (FIG. 2a) when the extension panels 31,32 are unfolded into an open position.

The coupling rod 78 is pivotally connected to the second bracket portion 75 by a pin inserted through holes 79. At a second end, the coupling rod 78 is pivotally connected to the second extension panel 32 along pivot axis 82.

It will be apparent to the skilled addressee that the bracket assembly 72 pivots with respect to first extension panel 31 into the stowed position at the same time as the extension panels 31,32 move into the closed position. As such, the antenna 70 is "tucked" inside the volume of the grain tank 22 and protected by the closed extension panels 31,32,41,42 when out of use. Furthermore, the pivoting movement of the bracket assembly 72 minimizes any interference between the antenna 70 and the movement of rear extension panels 41,42 into the closed position.

From reading the present disclosure, other modification will be apparent to persons skilled in the art. Such modifications may involve other features which are already known in the field of combine harvesters and which may be used instead of or in addition to features already described herein.

The invention claimed is:

1. An Antenna mounting apparatus for a combine harvester, the apparatus comprising
   a first grain tank extension panel pivotally mounted with respect to a frame so as to be moveable between an open, extended, position and a closed, retracted, position,
   an antenna-supporting bracket pivotally mounted to the first grain tank extension panel around a first pivot axis, and
   an actuation device comprising
      a mechanical linkage coupled to the antenna-supporting bracket, said mechanical linkage being arranged so as to couple pivoting movement of said antenna-supporting bracket with movement of the first grain tank extension panel so as to pivot the antenna-supporting bracket with respect to the first grain tank extension panel when the first grain tank extension panel moves between the open position and closed position.

2. The antenna mounting apparatus according to claim 1, wherein the mechanical linkage comprises a coupling rod connected at a first end to the antenna-supporting bracket.

3. The antenna mounting apparatus according to claim 1, and comprising a grain tank extension panel assembly comprising the first grain tank extension panel and a second extension panel, wherein the first grain tank extension panel is pivotally mounted to the second extension panel around a second pivot axis, and wherein the second extension panel is pivotally mounted to the frame around a third pivot axis.

4. The antenna mounting apparatus according to claim 3, wherein the first, second and third pivot axes are mutually parallel.

5. The antenna mounting apparatus according to claim 4, wherein the mechanical linkage comprises a coupling rod connected at a first end to the antenna-supporting bracket and at a second end to the second extension panel.

6. A combine harvester comprising a grain tank and the antenna mounting apparatus according to claim 1.

7. The combine harvester according to claim 6, comprising a first and a second grain tank extension panel assemblies, each being pivotally mounted to the frame along opposing edges of the grain tank, and each grain tank extension panel assembly being moveable between open and closed positions, wherein the grain tank extension panel assemblies are configured to provide a protective cover for the grain tank when in the closed position, and wherein the antenna is located under the protective cover.

8. The combine harvester according to claim 6, wherein the antenna extends above the height of the grain tank extension panel to which said antenna is mounted, when the grain tank extension panel is in a fully open position.

* * * * *